United States Patent [19]
Marchand et al.

[11] Patent Number: 5,700,384
[45] Date of Patent: Dec. 23, 1997

[54] METHOD OF MANUFACTURING A SPLIT MASTER LINK BY ELECTRICAL DISCHARGE MACHINING

[75] Inventors: Jean-Louis Marchand, Vourey; Michel Palomera, Echirolles; Michel Peeters, Bernin; Jean-Paul Salomon, Tullins, all of France

[73] Assignee: Caterpillar Inc., Peoria, Ill.

[21] Appl. No.: 554,923

[22] Filed: Nov. 9, 1995

[51] Int. Cl.$^6$ ............................................ B23H 9/00
[52] U.S. Cl. ............................ 219/69.12; 219/69.17
[58] Field of Search ............................ 219/69.12, 69.17

[56] References Cited

U.S. PATENT DOCUMENTS

| | | | |
|---|---|---|---|
| 4,332,425 | 6/1982 | Baylor | 305/54 |
| 4,361,364 | 11/1982 | Brunn | 305/58 R |
| 4,365,848 | 12/1982 | Grilli et al. | 305/54 |
| 4,455,054 | 6/1984 | Brunn | 305/58 R |
| 4,579,394 | 4/1986 | Bedis et al. | 305/54 |

FOREIGN PATENT DOCUMENTS 59-102533  6/1984  Japan ................... 219/69.12

*Primary Examiner*—Geoffrey S. Evans
*Attorney, Agent, or Firm*—Lawhorn, Simpson & Polsley

[57] ABSTRACT

A method for manufacturing an endless track split master link consisting of forming a split master link process blank, machining the bores for the link pins to engage the adjacent track links and for accepting a securing apparatus, securing the process blank in an Electrical Discharge Cutting Machine tool (EDM) by placing mandrels in the EDM through the link pin bores, calculating a cutting path to generate complimentary fit-up faces between the link pin bores, storing the calculated cutting path in a memory in the EDM, actuating a cutting element along the calculated cutting path, emplacing a securing apparatus, and removing the split master link from the mandrels.

17 Claims, 2 Drawing Sheets

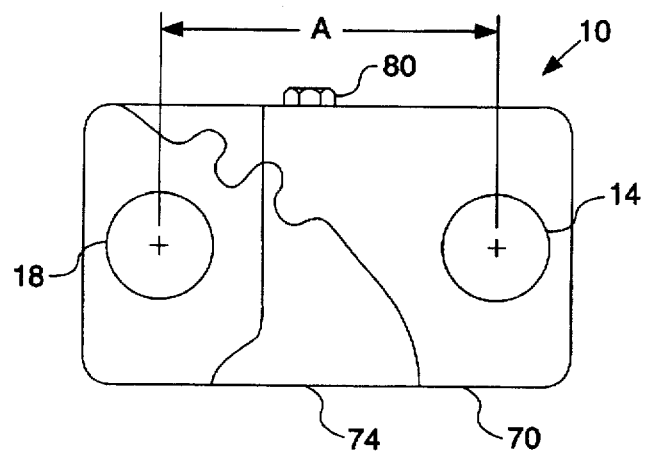
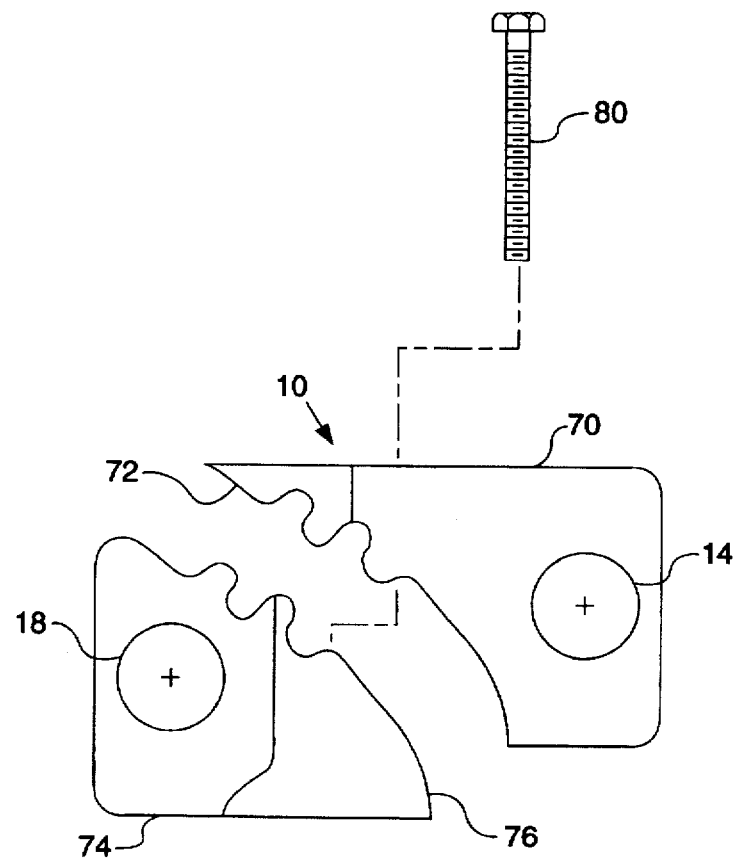

METHOD OF MANUFACTURING A SPLIT MASTER LINK BY ELECTRICAL DISCHARGE MACHINING

TECHNICAL FIELD

This invention relates generally to endless track apparatus, and more particularly to endless track split master links for joining the ends of the track to complete the endless track and methods of manufacturing the same.

BACKGROUND ART

In an endless track suitable for locomotion and use in track-type equipment, a means must typically be provided for joining the two ends of the track to complete the endless track. A split master link is typically provided to join these two ends of the track. The typical split master link is comprised of at least two parts. The two parts are commonly provided with two opposing substantially complementary surfaces, or fit-up faces designed for a mutually engaging fit. Securing means are provided to secure the two parts together. When the two parts are secured together, the split master link approximates in dimension the other links in the endless track. The typical endless track link provides two spaced apart horizontal bores, permitting a link pin to be inserted through each bore into the adjacent bore for the next successive track section. In this matter, each successive track section is joined to the next track section with one part of the split master link at each end of the track sections so that when the split master link parts are joined the endless track is completed.

The two parts of the typical split master link are commonly fabricated from two separately formed blanks designed specifically to form each of the parts of the split master link. Each of the two parts is separately machined and provided with a bore to engage the last prior track section. Each of the parts further includes a profile having excess material on the face that will be the fit-up face so as to permit the removal of material to form the finished fit-up face. Each of the fit-up faces on the adjacent parts of the split master link must be machined to relatively close dimensional tolerances to permit a relatively tight joint between the complimentary fit-up faces.

Failure to machine the fit-up faces to relatively close dimensional tolerances may render impossible a tight joint between these faces, and thus between the two parts of the split master link. A loose joint between the parts of the split master link may permit relative motion between the two parts, or may transfer excessive forces to the securing means of the split master link, causing the securing means to loosen or even possibly to fail. In either case, undesirable maintenance and unnecessary equipment down time results.

Furthermore, even where the complimentary faces are within permissible machining tolerances, discrepancies between the two faces may cause misalignment of the two horizontal bores in the split link, introducing unnecessary torsional and other forces upon the linking pins and accelerating the wear of the linking pins, the split master link, or the adjoining track sections. Additionally, since the two parts of the split master link must be separately manufactured, a substantial amount of time and effort must be devoted to the manufacture of these split master link parts.

The present invention is directed to overcoming one or more of the problems as set forth above.

Therefore, it is an object of the present invention to provide a split master link comprised of two parts which may be simultaneously manufactured.

It is another object of the present invention to provide such a split master link as may be manufactured with the formation of minimal amount of scrap.

It is yet a further object of the present invention to provide such a split master link as may be manufactured with the minimal number of manufacturing steps.

It is another object of the present invention to provide such a split master link as may provide substantially true parallelism of the two horizontal link pin bores.

It is yet another object of the present invention to provide such a split master link as will provide to two parts having maximally complimentary opposing link faces.

It is yet a further object of the present invention to provide such a split master link as will be readily and inexpensively manufactured.

It is yet a further object of the present invention to provide a method of manufacturing a split master link which will be readily and easily employed.

It is yet another object of the present invention to provide such a split master link as may readily be shipped, manufactured, and completed in kit form for ready use or shipment.

These and other objects of the present invention will be apparent in the specification, claims and drawings hereinafter.

DISCLOSURE OF THE INVENTION

In one aspect of the present invention the method of manufacture of the improved split master link may be seen to include generating a completed split master link process blank including two spaced apart horizontal bores, finish machining the spaced apart horizontal bores for accepting link pins to adjoining track sections, securing the split master link process blank to two spaced apart mandrels for securing the split master link process blank, pre-boring at least one bore for accepting a split master link securing means between the two parts of the split master link in a bore spaced between and perpendicular to the link pin bores, cutting the split master link process blank into two split master link parts by operating upon the split master link with a wire electric discharge cutting machine along a selected line or fit-up profile between the two link pin bores, and inserting a split master link securing means into the split master link securing means bore to secure the master link, and removing the joined split master link parts from the mandrels.

BRIEF DESCRIPTION OF THE DRAWINGS

FIG. 4 shows a completed split master link according to the present invention.

FIG. 5 shows a completed split master link according to the present invention with the securing means removed for installation in an endless track.

BEST MODE FOR CARRYING OUT THE INVENTION

Figure 1:
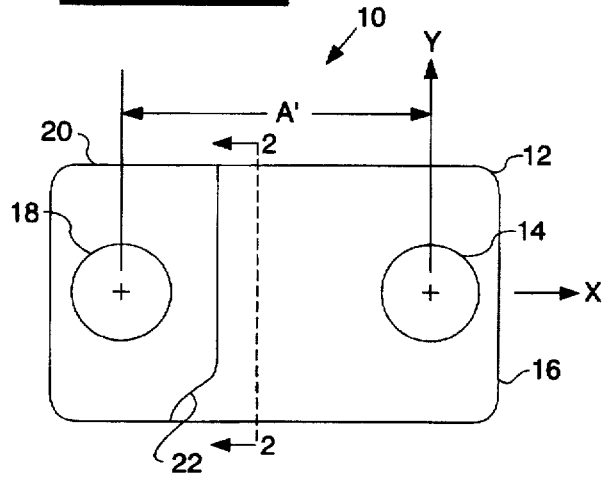
FIG. 1 shows a side view of a split master link process blank according to the present invention.

A split master link generally according to the present invention is shown in FIG. 1 and referred to with reference number 10. Those skilled in the relevant art will understand that the split master link 10 described herein is generic in character for convenience of description, and is not intended to limit the applicability of the subject invention to any specific split master link. Furthermore, the terms upper, lower, top and bottom refer to the orientation of the split master link 10 as disclosed in the drawing figures, and not to the orientation thereof when completed. It is assumed herein that the process blank is formed by forging or casting steel or steel alloy to substantially the desired overall dimensions.

Figure 2:
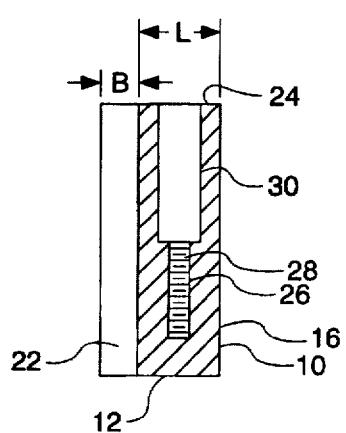
FIG. 2 shows a cross-sectional view of the split master link process blank of the present invention taken along section line 2—2 of FIG. 1.

Turning then to FIGS. 1 and 2, the split master link 10 is shown in its initial state as a split master link process blank 12. The link process blank 12 includes a first link pin bore 14 in a first end 16 and a second link pin bore 18 in a second link end 20. The second link pin bore 18 is on an axis parallel to and spaced-apart by a distance A' from the first link pin bore 14. Distance A' is a distance A which the axes of the bores 14 and 18 are to be spaced apart in the completed split master link 10, plus a relatively small process distance P.

As seen in FIG. 2, the process blank 12 has a substantially uniform width or thickness L. Also, the second end 20 is offset at shoulder 22 by an offset width B from the first end 16. This offset B permits successive, overlapping engagement of the completed split master link 10 with the next adjacent track links in the endless track in which the split master link 10 may be employed.

According to the subject invention, the first link pin bore 14 and the second link pin bore 18 are machined, typically by milling, to the desired diameter for accepting link pins to engage the next adjacent track links.

In the master link top surface 24 is machined, typically by boring, a link securing hole 26 extending vertically substantially through the process blank 12. The link securing hole 26 includes a first lower portion 28 in which threads are formed and a second, relatively larger diameter upper portion 30.

Figure 3:
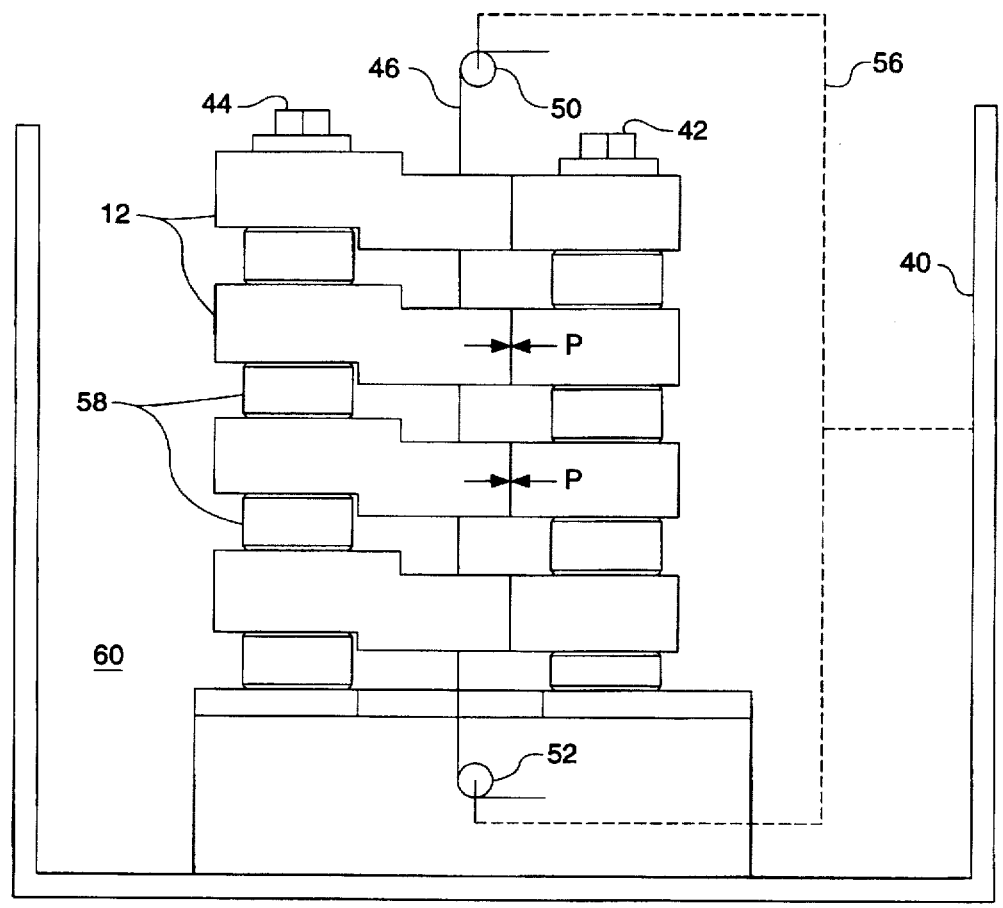
FIG. 3 shows a plurality of the split master link process blanks in an Electrical Discharge Machine according to the present invention.

As seen in FIG. 3, the split master link process blank 12 is secured in a wire-type electrical discharge or electro-discharge cutting machine, or EDM, 40. The split master link process blank 12 is secured by a first mandrel 42 extending through the first link pin bore 14 and a second mandrel 44 extending through the second link pin bore 18.

The first and second mandrels 42 and 44 are preferably vertically oriented and are spaced apart by the distance A'. This places the process blank 12 in a planar, horizontal orientation. A wire-type cutting element 46 extends vertically between an upper pulley 50 and a lower pulley 52, and thus is perpendicular to the process blank 12. The upper pulley 50 and the lower pulley 52 are secured in a cutting head assembly 56 (not shown). As shown, the cutting element moves from the upper pulley 50 to the lower pulley 52.

In relation to the commonly understood Cartesian coordinate system employing the x-, y-, and z-axes, the cutting head assembly 56 of the EDM 40 is selectively moveable and positionable along the x-y axes in the horizontal plane, while the cutting element 46 is fed in the z-axis. Those skilled in the art will recognize that the same result is attained in an EDM 40 wherein the cutting head assembly 56 is stationary and the workpiece, the process blank 12, is moved in the x-y axes with respect to the cutting head assembly 56.

Preferably, the first and second mandrels 42 and 44 are of sufficient length to accommodate at least four (4) process blanks 12. In this configuration, the process blanks 12 are maintained in a parallel, spaced-apart horizontal relationship within the workspace 60 of the EDM 40. Spacers 58 are placed between the respective process blanks 12 to ensure a fixed, desired vertical separation therebetween. When so secured, all four process blanks 12 can be simultaneously operated upon by the cutting element.

The EDM 40 also provides that the workspace 60, in which the cutting head assembly 56 operates and the first and second mandrels 42 and 44 are disposed, is sufficiently voluminous to permit the complete immersion of the first and second mandrels 42 and 44, together with the process blanks 12 secured thereto. In order to facilitate the cutting operation of the cutting element 46, it is preferable to immerse the process blanks 12 in anodized water or other non-flammable anodized solution.

It is further preferable that the EDM 40 include a means (not shown) for selectively controlling the movement of the cutting head assembly 56 in both the x-axis and the y-axis. According to the preferred embodiment, this EDM control means may be electrical, mechanical, or hydraulic, but includes a microprocessor-driven electronic controller for actuating and controlling the movement of the cutting head assembly 56. The microprocessor-driven electronic controller of the EDM 40 may also be a computer-driven controller suitable for integration into a larger, computer-aided-manufacturing environment. It is believed that those skilled in the relevant art will be able to comprehend the type of EDM apparatus and EDM controller best adapted to operating on any given process blank 12.

In either case, however, the microprocessor-driven electronic controller of the EDM 40 must have a memory means for storing and recalling a cutting path of the cutting element 46 in the x-y axes, and means for actuating the cutting head assembly 56 to cause the cutting element 46 to move along that path.

According to the present invention, the axis of the first link pin bore 14 is designated as point where the values of x and y are zero (0), that is (x=0,y=0). The cutting path along which the cutting element 46 must be moved to divide the process blank 12 into the two resulting parts of the split master link 10 and to attain the desired fit-up faces in the split master link 10 may then be calculated, either as a series of curves and lines or as a series of coordinate points along which the cutting head assembly 56 is to move the cutting element 46, with the appropriate result being stored in the memory means of the EDM 40.

With the first and second mandrels 42 and 44, together with the process blanks 12, being completely immersed in the workspace 60 of the EDM 40, and the cutting path having been calculated and stored in the memory means of the EDM 40, the cutting head assembly 56 is then actuated to direct the cutting element 46 along the selected cutting path through the process blank 12. As the wire cutting element 46 is moved along the cutting path, a slot of width P in the shape of the cutting path is cut in each of the process blanks 12.

Turning then to FIGS. 4 and 5, the split master link 10 can be seen in completed and disassembled forms, respectively. The split master link 10, having been cut into a first part 70 with fit-up face 72 generated by the cutting element 46, and a second part 74 with a corresponding fit-up face 76 simultaneously generated by the cutting element 46, are secured together by a securing means 80. The securing means 80 is preferably a threaded bolt of sufficient length to substantially extend from the link top surface 24 through the upper portion 30 of the link securing hole 26 and into the lower portion 28 thereof to engage the threads and secure together the first and second parts 70 and 74 of the split master link 10.

The first and second parts 70 and 74 of the split master link 10 are secured together with securing means 80 prior to the removal of the split master link 10 from the first and second mandrels 42 and 44 to ensure that matched sets of the first and second parts 70 and 74 are used, with the result that any errors in the dimensions of the split master link 10 due to machining is minimized.

FIG. 5 particularly shows the completed split master link 10 with the securing means 80 removed to permit installation of the split master link 10 in an endless track (not shown). This permits the first and second parts 70 and 74 to separate. The first and second parts 70 and 74 may then be linked to the respective ends of the endless track in which the split master link 10 is to be employed.

It must be noted that the split master link 10 may employ more than one securing means 80 where additional link securing holes 26 are provided, as it may be desirable to provide such additional link securing means 80 for greater strength in some applications.

In summary, the method according to the subject invention of manufacturing the split master link 10 includes the steps of: forming a split master link process blank 12 by forging or casting a suitable material such as steel or steel alloy; boring, by a process such as vertical milling, the first link pin bore 14 and the second link pin bore 16 in the process blank 12 to the requisite respective diameters to accept the track link pins; boring, by milling or drilling, in the top surface 24 of the process blank 12 a vertical link securing hole 26 and forming in at least a portion thereof screw threads for accepting a correspondingly threaded securing means 80; securing the process blank 12, or a plurality of process blanks 12, in an Electrical Discharge Machine tool, an EDM 40, by securing a first mandrel 42 axially through the first link pin bore 14 a and a second mandrel 44 axially through the second link pin bore 18, the first and second mandrels extending vertically in a workspace 60 of the EDM 40; calculating a cutting path in the x-y axes to generate a fit-up profile in the process blank 12 between the first link pin bore 14 and the second link pin bore 18; storing the calculated cutting path in a memory means in the EDM 40; actuating in the x-axis and y-axis a cutting head assembly 56 of the EDM 40 to move a cutting element 46 to generate the fit-up profile in the process blank 12, or in each of the process blanks 12 simultaneously, and to divide the process blank 12 into a first part 70 and a second part 74; placing a securing means 80 into the link securing hole 26 to secure together a completed split master link 10 comprised of the securing means 80 and the first part 70 and second part 74; and removing the completed split master link 10 from the first and second mandrels 42 and 44.

Industrial Applicability

In practice, the subject invention offers substantial benefits and advantages.

The method according to the subject invention substantially reduces the number of manufacturing steps and processes required to generate the completed split master link 10, since both parts 70 and 74 are generated simultaneously from the process blank 12. This alone will substantially reduce the cost of manufacturing the split master link 10 by reducing both machine usage and the number of man-hours involved in generating each split master link 10.

In addition, the amount of material which must be removed as scrap in the generation of the fit-up faces 72 and 76 of the first and second parts 70 and 74 is substantially reduced, being only that material removed in the process width P, which is typically on the order of 0.030 inches, as compared to the substantial excess material which must be removed according to the prior art.

Furthermore, the method according to the present invention substantially reduces the inventory burdens associated both with manufacturing and with stocking and shipping the split master link 10. Initially, the process blank 12 replaces the two separate part process blanks supplied in the prior art. During the manufacturing process, all steps are applied to the process blank 12 rather than two separate part process blanks. Likewise, the subject invention provides a completed split master link 10 which may be stored and shipped as a single unit rather than as two separate parts of a split master link and a separate securing means, reducing the inventory load from at least three parts to one for each split master link 10.

Finally, the method according to the present invention provides a split master link 10 which is substantially dimensionally superior to the split master link of the prior art. Since each split master link 10 is manufactured as a unit, dimensional compliance of the dimension A can be assured. Similarly, a complimentary fit of the fit-up faces 72 and 76 is assured, and the first and second parts 70 and 74 will mate properly even if the fit-up faces 72 and 76 would otherwise be outside the desired dimensional parameters and could not mate well with the components of other split master links 10.

Other aspects, objects and advantages of the subject invention can be obtained from a study of the drawings, the disclosure and the appended claims.

What is claimed is:

1. A method of manufacturing a split master link for use in an endless track, the method comprised of:
   forming a split master link process blank;
   securing the split master link process blank in an electrical discharge cutting machine; and
   actuating a cutting element of the electrical discharge cutting machine along a cutting path to generate complimentary fit-up faces in the split master link process blank.

2. The method according to claim 1 wherein said method of manufacturing a split master link further includes the step of machining a first bore and a second bore in said split master link process blank separated by a distance A'.

3. The method according to claim 2 wherein said method of manufacturing a split master link further includes the step of securing a first mandrel through said first bore and a second mandrel through said second bore.

4. The method according to claim 3 wherein said method of manufacturing a split master link further includes the step of calculating said cutting path and storing said calculated cutting path in a memory means in the electrical discharge cutting machine.

5. The method according to claim 4 wherein said step of calculating said cutting path further includes the step of calculating said cutting path along points in the x-axis and y-axis of the Cartesian coordinate system.

6. The method according to claim 4 wherein said step of calculating said cutting path further includes the step of calculating said cutting path along points in the x-axis and y-axis of the Cartesian coordinate system where the values of x and y are 0 at the axis of the first link pin bore.

7. The method according to claim 2 wherein said method of manufacturing a split master link further includes the step of machining a link securing hole in said split master link process blank.

8. The method according to claim 1 wherein said method of manufacturing a split master link further includes the step of placing a securing means into said link securing hole in said split master link process blank.

9. A method of manufacturing a split master link for use in an endless track, the method comprised of:

forming a split master link process blank;

machining a first bore and a second bore in said split master link process blank separated by a distance A';

securing the split master link process blank in an electrical discharge cutting machine by placing a first mandrel through said first bore and a second mandrel through said second bore;

calculating a cutting path and storing said calculated cutting path in a memory means in the electrical discharge cutting machine tool;

actuating a cutting element of the electrical discharge cutting machine along said cutting path to generate complimentary fit-up faces in the split master link process blank and to cut said split master link process blank into a first part and a second part.

10. The method according to claim 9 wherein said step of calculating said cutting path further includes the step of calculating said cutting path along points in the x-axis and y-axis of the Cartesian coordinate system.

11. The method according to claim 9 wherein said step of calculating said cutting path further includes the step of calculating said cutting path along points in the x-axis and y-axis of the Cartesian coordinate system where the values of x and y are 0 at the axis of the first link pin bore.

12. The method according to claim 9 wherein said method of manufacturing a split master link further includes the step of boring a link securing hole in said split master link process blank.

13. The method according to claim 12 wherein said method of manufacturing a split master link further includes the step of placing a securing means into said link securing hole in said split master link process blank.

14. The method according to claim 9 wherein the step of securing a split master link process blank further includes the step of securing a plurality of said split master link process blanks to said first and second mandrels in a parallel, spaced-apart horizontal relationship.

15. A method of manufacturing a split master link for use in an endless track, the method comprised of:

forming a plurality of split master link process blanks;

machining a first link pin bore and a second, parallel link pin bore spaced apart from said first link pin bore by a distance A' in each said split master link process blank, and a securing means hole between and having an axis perpendicular to the axis of said first and second link pin bores;

securing each of said plurality of the split master link process blanks in an electrical discharge cutting machine by placing a first mandrel through said first bore and a second mandrel through said second bore of each of said split master link process blanks;

calculating a cutting path and storing said calculated cutting path in a memory means in the electrical discharge cutting machine;

actuating a cutting element of the electrical discharge cutting machine along said cutting path to generate complimentary fit-up faces in each split master link process blank and to cut each said split master link process blank into a first part and a second part;

placing a securing means in the link securing hole of each said split master link process blank; and removing said split master link from said electrical discharge cutting machine.

16. The method according to claim 15 wherein the step of calculating said cutting path further includes the step of designating the vertical axis of the first link pin bore as the x=0, y=0 coordinate.

17. The method according to claim 15 wherein the step of machining a link securing hole in each said split master link process blank further includes providing a lower threaded portion in said link securing hole.

* * * * *